US012494897B2

(12) United States Patent
Lee et al.

(10) Patent No.: US 12,494,897 B2
(45) Date of Patent: Dec. 9, 2025

(54) METHOD OF GENERATING RANDOMNESS BY PUBLIC PARTICIPATION

(71) Applicants: National Taiwan University, Taipei (TW); The Board of Trustees of the University of Illinois, Urbana, IL (US)

(72) Inventors: Hsun Lee, Taipei (TW); Yuming Hsu, Taipei (TW); Jing-Jie Wang, Taipei (TW); Hao Cheng Yang, Taipei (TW); Yu-Heng Chen, Taipei (TW); Yih-Chun Hu, Urbana, IL (US); Hsu-Chun Hsiao, Taipei (TW)

(73) Assignees: National Taiwan University, Taipei (TW); The Board of Trustees of the University of Illinois, Urbana, IL (US)

( * ) Notice: Subject to any disclaimer, the term of this patent is extended or adjusted under 35 U.S.C. 154(b) by 216 days.

(21) Appl. No.: 18/099,024

(22) Filed: Jan. 19, 2023

(65) Prior Publication Data

US 2023/0299939 A1    Sep. 21, 2023

Related U.S. Application Data

(60) Provisional application No. 63/302,804, filed on Jan. 25, 2022.

(51) Int. Cl.
*H04L 9/06* (2006.01)
(52) U.S. Cl.
CPC .................. *H04L 9/0643* (2013.01)
(58) Field of Classification Search
None
See application file for complete search history.

(56) References Cited

U.S. PATENT DOCUMENTS

| | | | | |
|---|---|---|---|---|
| 11,184,166 | B2 * | 11/2021 | Lampkins | H04L 9/0869 |
| 2018/0034636 | A1 * | 2/2018 | Benarroch Guenun | |
| | | | | H04L 9/3073 |
| 2020/0252211 | A1 * | 8/2020 | Chen | H04L 9/0894 |
| 2023/0318857 | A1 * | 10/2023 | Nazarov | H04L 9/30 |
| | | | | 713/166 |

FOREIGN PATENT DOCUMENTS

| | | | | |
|---|---|---|---|---|
| CA | 2543796 C | * | 12/2015 | H04L 63/045 |
| CN | 113407156 A | * | 9/2021 | G06F 21/64 |

* cited by examiner

*Primary Examiner* — Jeffrey R Swearingen
(74) *Attorney, Agent, or Firm* — Chen Yoshimura LLP

(57) ABSTRACT

A method of generating randomness by public participation may comprise: communicating with the commodity devices to execute a protocol comprising a setup phase, a contribution phase and a result-generation phase, wherein: in the setup phase, parameters are initialized, a verifiable delay function is setup, and the parameters are published; the contribution phase is divided into at least one first stage, published parameters are provided, random values are received, and a Merkle tree root and Merkle tree audit paths are published in each of the first stage; and the result-generation phase is divided into at least one second stage of the same number as that of the first stage, each second stage is dedicated to one of the first stage ahead of the second stage for a period, and in each second stage, computation is performed to generate a result of randomness which is published.

15 Claims, 8 Drawing Sheets

```
1   def ClHash(x, d, k_l):
2     while True:
3       sprout = sha256(x).hexdigest()
4       a = int(sprout, 16)
5       a |= (1<<(k_l-1))
6       # make a=3(mod 4)
7       a |= 3
8
9       if isprime(a):
10        b = pow(d, (a-1)/2, a)==1:
11        b = pow(d, (a+1)/4, a)
12        if b%2!=1:
13          b = a-b
14        c = (b*b-d)/(4*a)
15        return (a, b, c)
16
17      # Incrementally change the sprout
18      # to generate next candidate.
19      t = ""
20      for i in range(0, len(sprout)):
21        t += chr(ord(sprout[i]) + 1) x
22      = t
```

Fig. 3

```
1  def H_D(x, k_d):
2      while True:
3          sprout = sha256(x).hexdigest()
4          d = int(sprout, 16)
5          d |= (1<<(k_d-1))
6          d |= 7
7
8          # In our optimized implementation
9          # Organizer directly tell contributors
10         # which iteration of the while loop
11         # will pass this primality test.
12         if isprime(d):
13             return -d
14
15         # Increamentally change the sprout
16         # to generate next discriminant candidate.
17         t = ""
18         for i in range(0, len(sprout)):
19             t += chr(ord(sprout[i]) + 1)
20         x = t
```

Fig. 4

METHOD OF GENERATING RANDOMNESS BY PUBLIC PARTICIPATION

INCORPORATION BY REFERENCE

This application claims priority and benefits from U.S. Provisional Patent Application No. 63/302,804, filed Jan. 25, 2022, the contents of which are hereby incorporated by reference in their entirety for all purposes.

FIELD OF THE INVENTION

The present invention generally relates to methods of generating randomness by public participation, either applied to a server of an organizer or a commodity device of a participant.

BACKGROUND OF THE INVENTION

Unpredictable and unbiased randomness is crucial for many applications concerning public interest, such as randomly drawing residents for limited vaccination, ensuring the trustworthiness of prize-linked savings accounts, and maintaining fairness in VAT-receipt lotteries. Today, these applications usually generate random values using a computer program or a live-streamed ball-drawing or die-throwing event. However, these methods provide no verifiable proof that their random values are indeed unpredictable and unbiased. Past incidents have also eroded public confidence in randomness generated by third parties.

One way to improve public confidence is via participatory randomness generation, which allows people to directly contribute entropy to the output and be assured of the result's unpredictability and bias resistance. To ensure the fairness of participation, such protocols should be secure, usable, and scalable so that even millions of people, without powerful machines, could contribute easily. Although a number of randomness generation techniques have been proposed since the introduction of coin-flipping protocols and randomness beacons, participatory randomness generation has not been widely adopted because existing protocols do not take the security, scalability, and usability of public participation into consideration simultaneously.

Some protocols apply verifiable random functions (VRFs) or extract randomness from Bitcoin or public financial data to compute the random result. Nonetheless, these approaches are insecure for participatory randomness generation because adversaries who know all the current contributions can bias the result by precomputing the best outcome before contributing. In order to defend against these kinds of biasing attacks, a secure protocol must bound the adversary's ability to predict the result before the end of the contribution phase. This unpredictability prevents adversaries from contributing a crafted contribution to bias the result.

However, existing secure approaches are inapplicable for large-scale participatory randomness generation due to scalability or usability issues. Protocols based on commitments, publicly-verifiable secret sharing (PVSS), and threshold signatures require multiple phases with high communication overhead to distribute keys, commit entropy or secret shares, reveal commitments, and recover the final results. In addition, these protocols assume that all or the majority of the predefined fixed set of participants are honest, which limits its usability in practice. On the other hand, protocols based on delay functions and verifiable delay functions (VDFs) can prevent adversaries from precomputing the result in time by delaying the result generation. However, their delay of the result publication after the contribution phase, what we called result-publication latency (RP latency), is relatively high because of the long result-generation time caused by delay functions and VDFs. Although existing randomness beacon protocols can reduce their RP latency by decreasing the beacon interval, the contribution phase for a specific output will also be shortened. This shortened contribution phase is ill-suited for public participation events, which often need to last for several days or weeks to ensure fairness and availability of public participation. Therefore, there is needed to develop a protocol which is publicly-verifiable with low RP latency and suitable for public participation events.

SUMMARY OF THE INVENTION

The present invention provides methods of generating randomness by public participation, either applied to a server of an organizer or a commodity device of a participant, in which a novel protocol which is publicly-verifiable with low RP latency and suitable for public participation events is executed by communication between the server and the commodity device. Preferably, the protocol may comprise a setup phase, a contribution phase, a result-generation phase and a verification phase.

In one aspect of the invention, an embodiment of the invention is provided that a method of generating randomness by public participation, applied to a server of an organizer, the server being capable to communicate with a plurality of commodity devices of a plurality of participants, comprising steps of: communicating, with the server, with the commodity devices to execute a protocol comprising a setup phase, a contribution phase and a result-generation phase, wherein: in the setup phase, a plurality of parameters are initialized, a verifiable delay function (VDF) is setup, and the parameters are published; the contribution phase is divided into at least one first stage, a plurality of published parameters are provided to the commodity devices, a plurality of random values are received from the commodity devices, and a Merkle tree root, $x_{root,j}$, and Merkle tree audit paths are published in each of the at least one first stage; and the result-generation phase is divided into at least one second stage of the same number as that of the at least one first stage, each of the at least one second stage is dedicated to one of the at least one first stage ahead of the at least one second stage for a period, and in each of the at least one second stage, computation is performed to generate a result of randomness, y, and y is published.

In another aspect of the invention, an embodiment of the invention is provided that a method of generating randomness by public participation, applied to a commodity device of a participant, the commodity device being capable to communicate with a server of an organizer, comprising steps of: communicating, with the commodity device, with the server to execute a protocol comprising a contribution phase, a result-generation phase and a verification phase, wherein: in the contribution phase, which is divided into at least one first stage, a plurality of published parameters are received and saved in the commodity device, and a plurality of random values for being published on a bulletin board, as a contribution $x_{i,j}$, are output from the commodity device to the server; and after a result of the randomness y is published in the result-generation phase, which is divided into at least one second stage, an amount of which is the same as that of the at least one first stage, in the verification phase, the result of the randomness y is verified by computing a root, r, with a Merkle tree audit path dedicated to the commodity device, published on the bulletin board in the contribution phase and acquired from the bulletin board, from the contribution $x_{i,j}$, and comparing the computed root, r, with a Merkle tree root, $x_{root,\,j}$, published on the bulletin board in the contribution phase, in which the randomness y is deemed to be verified if at least one condition is satisfied, the at least one condition comprises the computed root, r, matches the Merkle tree root, $x_{root,\,j}$. Further, in the verification phase, the result of the randomness y may be verified by confirming if a publication time of the Merkle tree root, $x_{root,\,j}$, is within a time of length $\epsilon$ after the end of a $j^{th}$ first stage of the at least one first stage of the contribution phase, in which $\epsilon$ is a duration of computing the Merkle tree root $x_{root,\,j}$, and the at least one condition further comprises the publication time of the Merkle tree root, $x_{root,\,j}$, is within the time of length $\epsilon$. Additionally, in the verification phase, the result of the randomness y is verified by computing Verify(vk, $H(X_{root,\,j}||y_{j-1})$, $y_j$, $\pi_j$) when $j>1$ and Verify (vk, $X_{root,\,1}$, $y_1$, $\pi_1$) when $j=1$, in which vk is a verification key, and the at least one condition further comprises Verify, corresponding to the randomness $y_j$, returns true.

BRIEF DESCRIPTION OF THE DRAWINGS

Various objects and advantages of the present invention will be more readily understood from the following detailed description when read in conjunction with the appended drawing, in which:

FIG. 3 shows an exemplary pseudo-code of an algorithm constructing ClHash, a hash function which receives given string x, discriminant d and security parameter $k_l$ for a to generate a group element (a, b, c)∈Cl(d) according to the invention;

FIG. 4 shows an exemplary pseudo-code of an algorithm HD, a function returning a ka-bit negative prime d≡1 (mod 8) verifying the VDFs according to the invention;

DESCRIPTION OF EMBODIMENTS OF THE INVENTION

Figure 1:
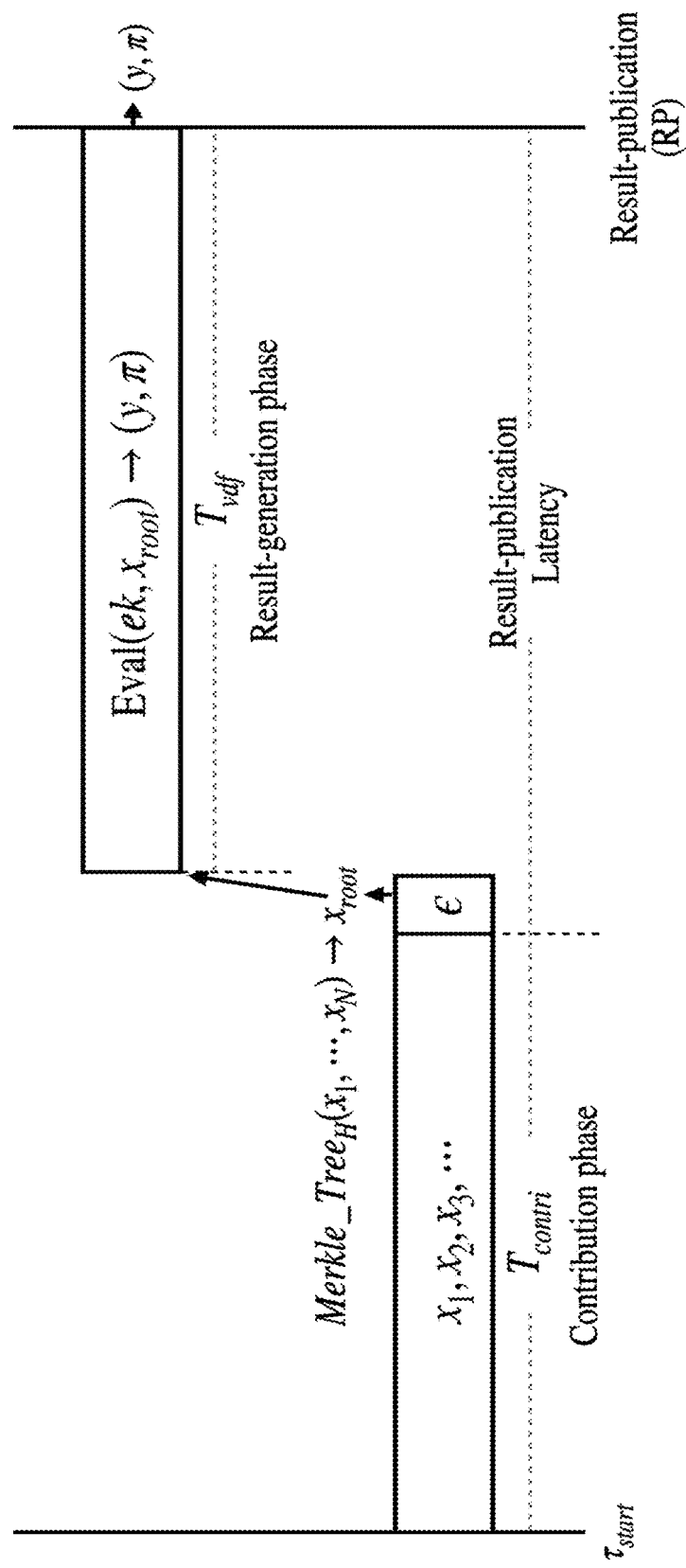
FIG. 1 shows a special case of a protocol used in a method of generating randomness by public participation according to the invention.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements.

Embodiments of the invention is provided that a method of generating randomness by public participation which may be applied to a platform of generating randomness by public participation. The platform may comprise a server of an organizer and a plurality of commodity devices of a plurality of participants. Both the server and the commodity devices may be capable to communicate with each other through a communication link. With the server and the commodity devices, the organizer and the contributors can publish messages to a public bulletin board, which provides correct message timestamps. In practice, the public bulletin board could be a public database, e-mail service, notification service, or blockchain.

According to the present invention, HeadStart, a participatory randomness protocol designed for public participation at scale is proposed and detailed later. HeadStart may comprise a contribution phase, a result-generation phase, and optionally a setup phase and a verification phase. HeadStart accepts the contributions from the public and generates unpredictable and bias-resistant results that can be efficiently verified on commodity devices without assuming other contributors are honest. The contribution phase can be sufficiently long with low RP latency to produce the result earlier. Then, according to the present invention, an algorithm ClHash, the first efficient algorithm that hashes to a class group of an imaginary quadratic field, bringing proof aggregation of class-group VDF from theory into practice, is presented. The implementation according to the present invention is evaluated to show HeadStart's feasibility when running on moderate or low-end devices. Details are illustrated in the following paragraphs.

According to the present invention, preferably, HeadStart is designed for public participation at scale here. HeadStart is scalable because its communication and verification complexity for each contributor are both only O(log C) with respect to the number of contributions C. The usability is from HeadStart's ease of direct participation, reasonable assumption on the honest participants (contributors), and low RP latency. The contributors can contribute entropy and efficiently verify HeadStart's result via their commodity devices without assuming that other contributors are honest. HeadStart's contribution phase can be opened for a sufficiently long time while achieving a considerably low result-publication latency (RP latency) that everyone can receive the result earlier. The result of HeadStart is generated by an organizer, such as a government or a large enterprise, who is responsible for generating a verifiable random result to convince the public.

Efficient verification and low RP latency are two important advantages of HeadStart that make it suitable for public participation. HeadStart achieves efficient verification by storing contributions in Merkle trees and adopting verifiable delay functions (VDFs), so the verification complexity is only O(L×polylog(T)+log C) for a contribution phase lasting for time T with C contributions. To overcome high RP latency caused by VDFs, HeadStart divides the contribution phase into L stages and gives its result-generation a "head start" of L−1 stages. Therefore, the RP latency of HeadStart can be reduced to only T/L, which is a huge improvement over T in existing approaches based on delay functions or VDFs. Moreover, HeadStart can be extended to a randomness beacon that can alleviate the burden of frequent re-registration when the beacon interval is short, because every honest participant can ensure the security of the subsequent L stages. All these improvements are only at the cost of verifying L VDF proofs with a time complexity of O(L× polylog(T)).

To further enhance HeadStart's verification performance in practice, an algorithm named ClHash is presented to bring VDF proof aggregation from theory into practice. Although VDF proof aggregation is a known technique in theory, no efficient implementation was available because implementing it requires solving a complex mathematical problem. To the best of our knowledge, our VDF implementation is the first to support proof aggregation in the class groups of imaginary quadratic fields, which can aggregate L VDF proofs into one. Besides, a mechanism called determined hash prime iteration (DHPI) is presented later to speed up the initialization of verification by about five times.

To demonstrate HeadStart's practicality for people using commodity devices, its verification costs are evaluated on personal computers and mobile phones using both browsers and native applications with various parameter settings. This evaluation shows that when L=100 and C=$10^6$, an iPhone XR application took only 10.7 seconds for verification regardless of the length of the contribution phase. This is significantly faster than previous schemes that require contributors to compute longer than the contribution phase.

Here, cryptographic primitives used in the present invention: participatory randomness generation, Merkle trees, and verifiable delay function (VDF) are introduced.

Participatory randomness generation allows a group of contributors to collectively generate an unpredictable, bias-resistant and verifiable result. Typically, it consists of two phases: (1) a contribution phase to gather randomness from the public (i.e., the contributors), and (2) a result-generation phase to compute the random output. It can be represented as RG $(k, x_1, x_2, \ldots, x_n) \to y$, where k is a security parameter and $x_1, x_2, \ldots, x_n$ are the contributions used to generate a randomness result $y \in [0, 2^k)$.

A participatory randomness generation protocol should satisfy the following security properties: 1) Unpredictability: If an adversary performs a prediction $y' \in [0, 2^k)$ to guess the output y before the end of the contribution phase, the probability that $y'=y$ is negligible with respect to the security parameter k; 2) Bias Resistance: An adversary cannot actively manipulate the result in a meaningful (i.e., predictable) way; 3) Verifiability: Honest contributors can verify the result's unpredictability and bias-resistance. Namely, they can ensure that no adversary can predict or manipulate the result to its advantage with nonnegligible probability.

Unpredictability defends against passive observers who do not participate in the protocol, and bias resistance defends against active adversaries who can contribute to the input. Related work also explicitly listed both in their security properties, so we followed this convention for ease of comparison.

A Merkle tree is a hash tree that employs a cryptographic hash function to build its tree nodes. Each leaf node is labeled with the hash value of the data, and each non-leaf node is labeled with the hash value of its children. Here, a typical Merkle tree may be implemented in binary form for example, while alternative implementations exist for specific purposes such as Fast Merkle Trees in Bitcoin and Dense Merkle Trees in the Certificate Transparency storage system.

The structure of a Merkle tree allows it to provide efficiently verifiable proof-of-inclusion for requested data included in the leaf nodes. Such proof-of-inclusion consists of an audit path, i.e., the set of nodes required to compute the hash value of the tree root from a leaf. If the root computed using the audit path matches the root in the proof, then the audit path proves that the leaf is in the tree. As a result, the time and space complexities to verify proof-of-inclusion are both O(log N), where N is the number of tree nodes.

VDF is a type of moderately hard cryptographic function whose results can be efficiently verified. It is a trio of algorithms, which can be represented as VDF=(Setup, Eval, Verify). These three algorithms are defined as follows: 1) Setup $(k, T) \to pp=(ek, vk)$ is a randomized algorithm that takes a security parameter k and a time parameter T as inputs. Its output pp, comprises two public parameters: an evaluation key ek and a verification key vk. By convention, a pp specifies the input space X and the output space Y; 2) Eval $(ek, x) \to (y, \pi)$ is a deterministic algorithm that takes an input $x \in X$, outputs the result $y \in Y$ along with a proof $\pi$ and must run in parallel time T with poly(log (T), k) processors; 3) Verify(vk, x, y, $\pi$)→{True, False} is a deterministic algorithm that outputs whether $y \in Y$ is the correct output of Eval (ek, x). The Verify algorithm, which is much faster than Eval, must run in total time poly(log (T), k).

For a Setup that needs secret randomness, such VDF will require a trusted setup to ensure that even the one that initializes the protocol does not have a trapdoor to speed up the VDF computation. For this reason, our implementation adopts a VDF with a non-trusted setup-specifically, one constructed based on the class groups of imaginary quadratic fields.

Additionally, a VDF must satisfy the following properties: 1) Correctness: For all k, T, pp and $x \in X$, if $(y, \pi) \leftarrow$ Eval (ek, x), then algorithm Verify(vk, x, y, $\pi$) must be True; 2) Soundness: A VDF is sound if for all algorithms A that run in time O(poly(T, k)) and $(x, y, \pi) \leftarrow A(k, pp, T)$, the probability of Verify(vk, x, y, $\pi$)=True but $y \neq$Eval (ek, x) is negl(k); 3) σ-sequentiality: A VDF is σ-sequential if (1) Eval can be computed in T to output $(y, \pi)$, and (2) no randomized algorithm with poly(T, k) parallel processors can distinguish y with non-negligible probability before time σ(T), i.e., the guaranteed lower bound of Eval time with O(poly(T, k)) processors.

In the random oracle model, one can extract a uniformly random string by applying a hash function to the unpredictable VDF output. The VDF needs not be pseudorandom to achieve this goal.

In addition, o-sequentiality implies that one can only obtain negligible information about y before computing Eval with time σ(T). A perfect VDF would achieve σ(T)=T, but this requirement is unrealistic. In practice, it is sufficient to use a VDF ensuring σ(T)=T−o(T), or even σ(T)=T−εT with small ε. Here, it is assumed that σ(T) to be less than but close to T, i.e., σ(T)≤T.

Embodiment I

HeadStart consists of four phases: setup, contribution, result-generation, and verification. The result-publication (RP) latency is the time span between the end of contribution and the end of result generation. HeadStart divides the contribution phase into L stages and gives the result-generation phase a "head start" of L−1 stages, reducing the RP latency to L-fold.

Figure 2:
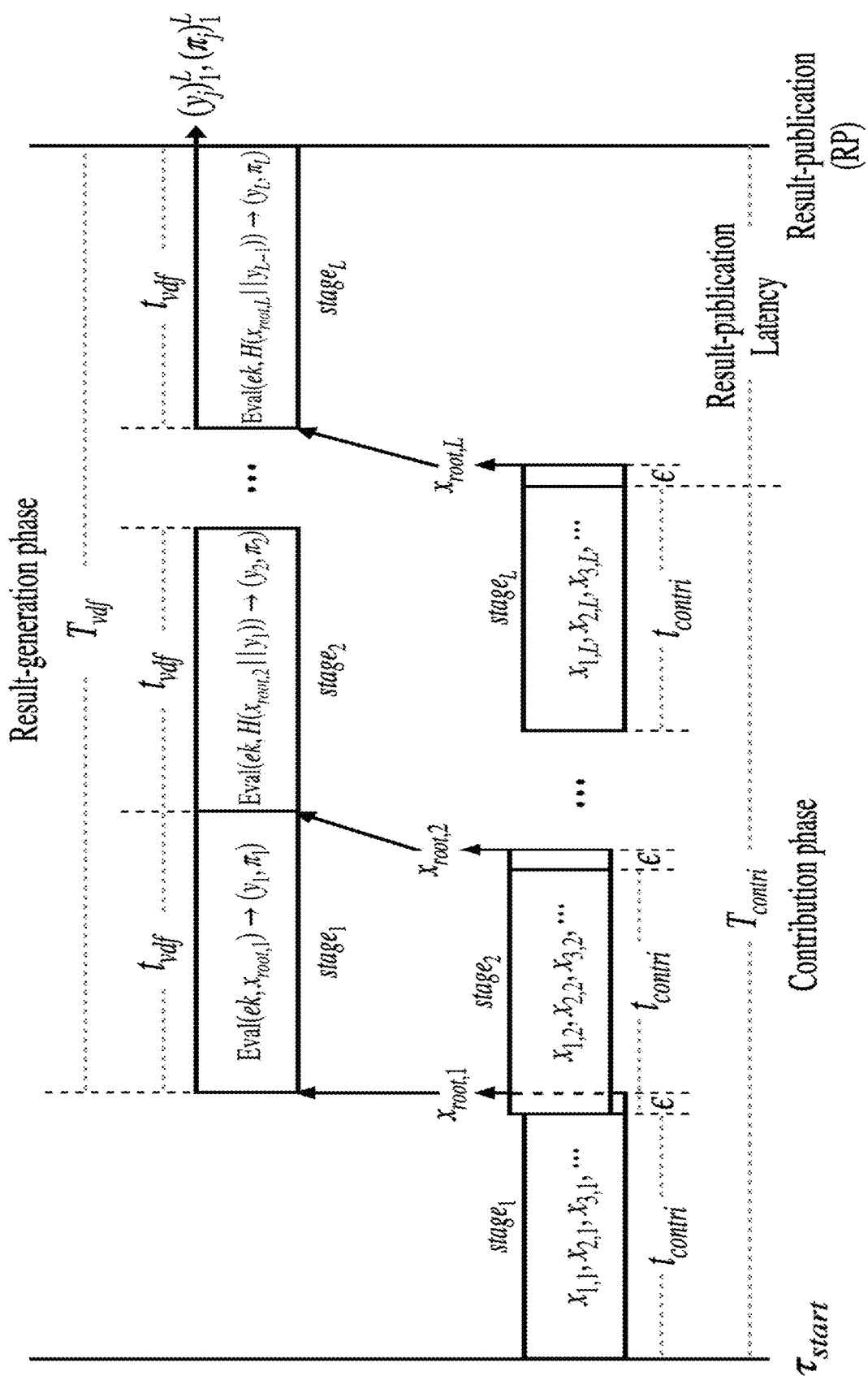
FIG. 2 shows a general case of a protocol used in a method of generating randomness by public participation according to the invention.

To explain the HeadStart protocol clearly, in the present embodiment, L=1, where L is the number of contribution stages. The notations are presented in Table I, and illustrate the special case in FIG. 1 and the general case in FIG. 2. Each phase is described in the detail below.

The setup phase consists of three sub-phases. These are: (1) parameter initialization, in which the organizer chooses the security parameter k, a cryptographic hash function H, and a σ-sequential verifiable delay function VDF=(Setup, Eval, Verify) with k-bit security level, and also decides the time parameters: $\tau_{start}$, $t_{contri}$, $\epsilon$, and $t_{vdf}$, where $\sigma(t_{vdf}) > t_{contri} + \epsilon$, $t_{contri} = T_{contri}$ and $t_{vdf} = T_{vdf}$; (2) VDF setup, in which the organizer runs pp←Setup (k, $t_{vdf}$) to configure the VDF; and (3) parameter publication, in which the organizer, with the server, publishes all the above parameters, including k, H, VDF, $\tau_{start}$, $t_{contri}$, $\epsilon$, $t_{vdf}$, PP=(ek, vk) to the bulletin board.

In the contribution phase, with the commodity devices, the participants (contributors) save the published parameters and publish random values to the bulletin board as the contribution $x_i$, where $x_i$ is in the range $[0, 2^k)$. After the end of this phase, the organizer gathers the contributions ($x_1$, $x_2$, ..., $x_C$) from $\tau_{start}$ to $\tau_{start} + t_{contri}$. Before entering the next phase, the organizer, with the server, computes and publishes the Merkle tree root $x_{root}$ and audit paths for each contributor to the bulletin board within time of length $\epsilon$ after the end of the contribution phase, which is subject to $t_{contri} + \epsilon < \sigma(t_{vdf})$, where $x_{root}$←Merkle Tree$_H$($x_1, x_2, ..., x_C$).

| Notation | Description |
|---|---|
| L | The number of divided contribution stages |
| C | The number of contributions |
| k | The number of bits of security level |
| $\tau_{start}$ | The start time of the contribution phase |
| $T_{contri}$ | The duration of the contribution phase |
| $t_{contri}$ | The duration of a contribution stage |
| $\epsilon$ | The duration of computing the Merkle tree root |
| $T_{vdf}$ | The duration of the result-generation phase |
| $t_{vdf}$ | The duration of the VDF |
| $\sigma(t_{vdf})$ | The lower bound of Eval with O(poly(T, k)) processors |
| $x_i$ | The value of ith contribution |
| $x_{i,j}$ | The value of ith contribution in stage j |
| $x_{root}$ | The root value of the Merkle tree |
| $x_{root,j}$ | The root value of the Merkle tree in the jth stage |
| $y_j$ | The randomness result in the jth stage |
| $\pi_j$ | The VDF proof in the jth stage |
| ‖ | The string concatenation op |

In the result-generation phase, although the final result y is unknown at this moment, it actually has been determined because $x_{root}$ has been published. The organizer then computes (y, π)←Eval(ek, $x_{root}$) to obtain the result y and the VDF proof R. This computation takes $t_{vdf}$ time. Lastly, the organizer publishes y and π to the bulletin board. As a result, the result publication occurs around $t_{vdf} + \epsilon$ after the contribution phase ends.

After result publication, in the verification phase, the contributors can verify the proof-of-inclusion and proof-of-VDF correctness to assure that HeadStart's result is unpredictable and bias-resistant. To verify the proof-of-inclusion, each of the contributors acquires his Merkle tree audit path from the bulletin board, and then computes the root r with the audit path from his contribution $x_i$. If the computed root r matches the published root $x_{root}$, then proof-of-inclusion is deemed to be verified. To verify the proof-of-VDF-correctness, the contributor first confirms that the publication time of $x_{root}$ is within time of length $\epsilon$ after the contribution phase, then computes Verify (vk, $x_{root}$, y, π), and accepts the proof-of VDF-correctness if Verify returns True.

Embodiment II

In the present embodiment, L>1. The major advantage of HeadStart is that it provides a parameter L that can be configured to reduce the RP latency L-fold while preserving security. In the general case, we extend the special case by dividing the phases into L stages and thus give its result-generation a head start of L−1 stages. Consequently, the RP latency of HeadStart can be reduced to around $T_{vdf}/L$.

The setup phase is made up of three sub-phases: (1) parameter initialization, in which the organizer chooses a parameter L, representing the number of contribution stages, along with the parameters as described in the special case, making $t_{contri} = T_{contri}/L$ and $t_{vdf} = T_{vdf}/L$; (2) VDF setup, in which the organizer computes pp←Setup (k, $t_{vdf}$) to setup the VDF; and (3) parameter publication, in which the organizer publishes L and other previously described parameters to the bulletin board.

The contribution phase is divided into L stages, each spans $t_{contri}$ and acts as a shorter contribution phase in the general case. After the jth contribution stage ends, the organizer computes and publishes the jth Merkle tree root $x_{root,j}$, and the audit paths for each contributor, within time of length c.

The result-generation phase is also divided into L stages. The organizer computes ($y_1$, $\pi_1$)←Eval (ek, $x_{root,1}$) for the first stage (j=1), and computes ($y_j$, $\pi_j$)←Eval (ek, H($x_{root,j}$‖$y_{j-1}$)) for all the other stages (j>1). In the last result-generation stage (j=L), the result $y_L$ is used as the result of the randomness generation. After yz is computed, the organizer publishes all the values $y_1$, ..., $y_L$, $\pi_1$, ..., $\pi_L$ to the bulletin board around the time of length L×$t_{vdf}$+$\epsilon$−(L−1)×$t_{contri}$ after the contribution phase.

In the verification phase, the contributors can verify the proof-of inclusion and the proof-of-VDF-correctness after the result publication. To verify the former, they acquire their audit paths from the bulletin board and follow the same process as in the special case. For the latter, they need to verify that all $x_{root,j}$ is published within time of length $\epsilon$ after the end of jth contribution stage, and all L VDFs were correctly computed by running Verify for each stage j. When j>1, Verify (vk, H($x_{root,j}$‖$y_{j-1}$), $y_j$, $\pi_j$) must return True, and when j=1, Verify (vk, $x_{root, 1}$, $y_1$, $\pi_1$) must return True.

HeadStart provides a parameter L that can reduce the RP latency. Compared with existing work based on delay functions or VDFs which result in high RP latency, HeadStart reduces the RP latency to L×$t_{vdf}$+$\epsilon$−(L−1)×$t_{contri}$. By setting the parameters to be $t_{vdf} \geq \sigma(t_{vdf}) \geq t_{contri} + \epsilon \geq t_{contri}$, the RP latency would be approximately $t_{vdf}$, which is L times less than the previous work's. Consider when the allocation is about medical supplies or refugee housing. This acceleration would be extremely important because it allows the contributors to have a reasonably long time to register and contribute to ensure the fairness of participation and meanwhile guarantees them to receive the result significantly faster than previous work.

The verification complexity of HeadStart is O(L×polylog (T)+log C) only because an honest contributor is only required to verify L VDFs and one Merkle tree. Although the VDF proof size grows linearly with the stage number L, we can adopt a VDF supporting proof aggregation, which can aggregate L VDF proofs into a single one, to reduce the proof size further.

About the scalability of HeadStart, the communication and verification complexity of a contributor are both O(log C) only with respect to the number of contributions C. In addition, HeadStart allows a large dynamic set of contributors to freely participate within the contribution phase without preregistration, whereas previous work assumes a fixed set of participants which cannot be more or less during the protocol execution. Their requirements impair the scalability of public participation where the participants are ordinary people.

The usability of HeadStart is from the low RP latency, ease of direct participation, and reasonable assumption on the honest contributors. First, people can contribute in HeadStart within a reasonably long contribution phase, while the RP latency can remain considerably low. Second, people can efficiently verify the result of HeadStart on commodity devices as we demonstrate later. Third, in reality, it is more convincing and practical to use HeadStart because the public can easily fulfill the assumption that at least one contributor is honest via direct participation, rather than asking them to believe that a system has a majority of honest participants.

In addition, the contributors in HeadStart cannot prevent the protocol from making progress, which avoids the public from denying the service whether intentionally or not. Previous work relies on a majority of honest participants to recover the unrevealed values or requires them to recompute the VDF evaluation to obtain the missing values hidden by the adversaries. For many public participation events, it is reasonable to place the responsibility of protocol execution on the organizer such as a government or a large enterprise instead of spreading upon the participants, since the organizer has to maintain his public reputation. If the organizer does not care about its public reputation, it does not have to adopt a verifiable randomness protocol in the first place.

HeadStart satisfies the security properties of participatory randomness generation. Without loss of generality, it is assumed that $\tau_{start}=0$. Unpredictability prevents an adversary from predicting the result before the publication of the Merkle tree root. Since the Merkle tree root is published right after the contribution phase ends, an adversary cannot predict the result if an honest contribution is included.

Lemma 1: When L=1, an adversary can not predict the result before the publication of the Merkle tree root. It is because that suppose an honest contribution is submitted at time $\tau_s \in [0, t_{contri}]$. The adversary cannot predict the result before time $\tau s + \sigma(t_{vdf})$ because of $\sigma$-sequentiality. Also, HeadStart requires the server to publish the Merkle tree root before $t_{contri}+\epsilon$, so the adversary cannot predict the result before the publication since $t_{contri}+\epsilon < \tau_s + \sigma(t_{vdf})$.

Lemma 2: If an honest contribution is included within any of the first j contribution stages ($1 \leq j \leq L$), an adversary cannot predict the $j^{th}$ result-generation stage's output $y_j$ before the publication of the Merkle tree root of the $j^{th}$ contribution stage. The unpredictability of $j^{th}$ result-generation stage's output in the general case with L stages is proved here. It is because that for the case when j=1, the honest contribution must be in the first (and only) contribution stage. According to Lemma 1, the adversary cannot predict the output before the publication of the Merkle tree root of this (first) contribution stage. Assuming that the statement holds when j=j': if an honest contribution is included within any of the first j' contribution stages ($1 \leq j \leq L$), The adversary cannot predict the $j'^{th}$ result-generation stage's output $y_{j'}$ before the publication of the Merkle tree root of the $j'^{th}$ contribution stage. When j=j'+1, there are two possible cases: the honest contribution is either within the first j' contribution stages, or in the $(j'+1)^{th}$ stage.

Case 1: The honest contribution is within the first j' contribution stages. According to the induction hypothesis, the adversary cannot predict the output $y_{j'}$ before the publication of the Merkle tree root of the $j'^{th}$ contribution stage. So $y_{j'}$ is unpredictable at time $t_{contri} \times j'$ for the adversary, and so is the $(j'+1)^{th}$ result-generation stage's input $H(x_{root,(j'+1)} \| y_{j'})$. By $\sigma$-sequentiality, the adversary cannot predict the $(j'+1)^{th}$ result-generation stage's output $y_{j'+1}$ before time $t_{contri} \times j' + \sigma(t_{vdf})$. Also, HeadStart requires the server to pub-lish the Merkle tree root of the $(j'+1)^{th}$ contribution stage before $t_{contri} \times (j'+1)+\epsilon$, so the adversary cannot predict the result before the publication because $t_{contri} \times (j'+1)+\epsilon < t_{contri} \times j' + \sigma(t_{vdf})$, which is the end of the $(j'+1)^{th}$ contribution phase.

Case 2: The honest contribution is in the $(j'+1)^{th}$ contribution stage. Suppose the honest contribution is submitted at time $t_{contri} \times j' + \tau_s$, where $\tau_s \in [0, t_{contri}]$, then the $(j'+1)^{th}$ result-generation stage's input $H(x_{root,(j'+1)} \| y_{j'})$ is unpredictable for the adversary at time $t_{contri} \times j' + \tau_s$. By $\sigma$-sequentiality, the adversary cannot predict the $(j'+1)^{th}$ result-generation stage's output $y_{j'+1}$ before time $t_{contri} \times j' + \tau_s + \sigma(t_{vdf})$. Also, HeadStart requires the server to published the Merkle tree root of the $(j'+1)^{th}$ contribution stage before $t_{contri} \times (j'+1)+\epsilon$, so the adversary cannot predict the result before the publication because $t_{contri} \times (j'+1)+\epsilon < t_{contri} \times j' + \tau_s + \sigma(t_{vdf})$.

Thus, as shown by Cases 1 and 2, the statement holds when j=j'+1. By induction, the statement holds for every j ($1 \leq j \leq L$).

Then we use Lemma 2 to prove the unpredictability of the general case with L stages.

Theorem 1 (Unpredictability): An adversary can not predict the result before the publication of the final Merkle tree root. We apply j=L on Lemma 2: An adversary cannot predict the $L^{th}$ result-generation stage's output $y_L$ before the publication of the Merkle tree root of the $L^{th}$ contribution stage if an honest contribution is included within any of the first L contribution stages. The assumption holds because HeadStart assumes that there exists at least one honest contribution and there are exactly L contribution stages. Also, the $L^{th}$ result-generation stage's output $y_L$ is the result, and the Merkle tree root of the $L^{th}$ contribution stage is the final Merkle tree root. So we can conclude that the adversary cannot predict the result before the final Merkle tree root.

Bias resistance defends against adversaries who can contribute to or manipulate the input from leading the result to their advantage. Although the adversaries may change the result, we show that they cannot predict the changed result to gain advantages.

Theorem 2 (Bias resistance): An adversary cannot actively manipulate the result in a meaningful (i.e., predictable) way. It is because that in the HeadStart protocol, the only inputs that the adversary can manipulate are the leaves of the Merkle tree. The adversary can add, exclude, and reorder the leaves. If the adversary excludes an honest contribution, then the proof-of-inclusion of that contribution can not be provided and the result would not be accepted. In other cases, there is still at least one honest contribution. Following the unpredictability of HeadStart (Theorem 1), the adversary cannot predict the result before the publication of the final Merkle tree root, no matter what kind of manipulation is performed. Therefore, the adversary can not influence the result in a meaningful way. After the publication of the final Merkle tree root, the inputs of each VDF are unchangeable, so the result cannot be influenced in any way.

An honest contributor can act as a verifier to verify the unpredictability and bias resistance of HeadStart's result with the following information: 1) the audit path of the Merkle tree containing the contributor's contribution; 2) H, VDF, vk; 3) $x_{root,j}$, $\forall 1 \leq j \leq L$, and their timestamps; and 4) $(y_j, \pi_j)$, $\forall 1 \leq j \leq L$.

These values are public on the bulletin board, so verifiers can acquire all these messages. The organizer cannot abort or refuse to follow the protocol because it will be detected by the verifiers who check the validity of information on the bulletin board. If an honest contributor has verified that his contribution is indeed in the Merkle tree, then there is at least one honest contribution and thus the unpredictability and bias resistance hold.

Embodiment III

HeadStart can be applied to implement a randomness beacon service by continuously accepting public contributions and outputting the results from each stage periodically. It can be viewed as an extension of HeadStart with endless stages: each stage outputs the result and passes on the result as an input to the next stage. For those who want to use the beacon, they can directly contribute within a range of stages and verify the result in exactly the same way as HeadStart.

Aside from the advantages inherited from HeadStart, a HeadStart beacon has another crucial advantage based on Theorems 1 and 2: every honest contributor can ensure the security (unpredictability and bias-resistance) of the subsequent L stages at the cost of L verifications. Consider when the beacon interval is configured to be a short time (such as several minutes) to ensure a low RP latency. In a HeadStart beacon, the contributors only need to contribute once and compute L verifications after L intervals to ensure that all the results within these intervals are secure. Compared with the existing randomness beacon services where the contributors must re-register and recontribute frequently for the following L stages to achieve the same purpose, the HeadStart beacon provides an L-fold trade-off to alleviate the burden.

Embodiment IV

HeadStart can be extended to achieve public verifiability, which ensures that a third party can verify the correct execution of the protocol via a protocol transcript.

Recall that in HeadStart, a contributor accepts the verification if his honest contribution is included because this is enough to ensure unpredictability and bias-resistance of the result. Although contributors can provide contributions for a third party to verify, HeadStart does not strictly achieve the above definition of public verifiability because this verification does not ensure the inclusion of other contributions.

We can extend HeadStart to be publicly verifiable by requesting verifiers to recompute the Merkle tree from all contributions. Alternatively, we can replace the Merkle tree with a hash chain where $chain_1 = H(x_1)$; $chain_i = H(chain_{i-1} \| x_i)$ for i>1, and using the result as the input of the VDF in each stage. Via these modifications, the verifiers can ensure that all contributions are correctly included by recomputing the Merkle tree or the hash chain. Both of them increase the verification and communication complexity from O(log C) to O(C), and the hash chain version has a constant factor improvement.

Formally, third parties and honest contributors can verify the result in the hash chain version of publicly-verifiable HeadStart by using the following public information: 1) all the contributions $(x_1, x_2, \ldots, x_C)$ within the contribution phase; 2) H, VDF, vk; 3) $x_{chain,j}$, $\forall 1 \leq j \leq L$, and their timestamps; and 4) $(y_j, \pi_j)$, $\forall 1 \leq j \leq L$.

These values are public on the bulletin board, so third parties and honest contributors can recompute the hash chain in each stage to verify proof-of-inclusion of every contributor, construct the input of VDF, and verify the protocol the same way as in HeadStart.

Frankly, public verifiability is not required for public participation scenarios because anyone who wants to verify the result can easily participate within the HeadStart protocol. HeadStart allows a large dynamic set of contributors to participate, whereas previous schemes assume a fixed set of participants throughout the protocol execution. Those schemes are designed for the case when a group of preregistered or private users wants to generate verifiable random outputs for others outside the group, so they need to achieve public verifiability to convince those outside the group. In those schemes, public verifiability is based on the assumption that the majority of the preregistered users are honest; otherwise, their security is unverifiable because third parties do not know the number of honest users.

It is practical and convincible for public participation events to use HeadStart because the public can easily fulfill the assumption that at least one contributor is honest via direct participation, rather than asking them to believe that a system has a majority of honest users or nodes.

Embodiment V

In the present embodiment, HeadStart may be applied to equitable COVID vaccine allocation. First, the contribution phase must be open for a reasonable time interval, such as several days, for public registration and contribution. Second, the government starts the result-generation phase. Without the L-stage optimization provided by HeadStart, the result publication would have been prolonged for another several days. However, every hour of delay in the vaccination program significantly undermines public health.

Using the HeadStart protocol to start an urgent vaccine allocation event whose registration lasts for L stages, we can publish the vaccination list L−1 stages earlier. As a result, this allows people to receive their doses in a fair manner, avoids the vaccines from expiring, and provides flexible reaction time for the government.

Although existing randomness beacon protocols can reduce their RP latency by decreasing the beacon interval, the shortened RP latency either requires all participants to register and contribute within a same beacon period, or re-register frequently in each interval until they eventually get chosen. To conclude, the advantages over high-latency randomness beacons, as mentioned above demonstrate the importance of HeadStart's L−1 stages acceleration.

Embodiment VI

In the present embodiment, a fully functional HeadStart system with improved performance is implemented to demonstrate its practicality. Two implementation-specific improvements are presented: (1) ClHash, an efficient algorithm that hashes to a class group of an imaginary quadratic field, which brings class-group VDF proof aggregation from theory into practice; and (2) determined hash prime iteration, which can further speed up the initialization of verification. In addition, we describe our programming language choices for our HeadStart implementation.

VDF selection: We choose to use a class-group VDF for three reasons. First, the verification of class-group VDF is very efficient because its complexity of group operations is O(1), faster than the formal requirement of VDF, which is poly(log (T), k). Second, it is based on groups of unknown order and can be initialized without a trusted setup. Third, it supports proof aggregation in theory, allowing further reductions in the proof size, and we present our algorithm ClHash to bring this theory into reality.

Although using a succinct argument with a sequential function (e.g., a hash chain) is a straightforward method to construct a VDF, we did not use SNARKs because of its trusted setup requirement. As for STARKs, its proof size and verification complexity are poly(log (T), k). For public participation choosing large T because of the need for a long contribution phase, it is better to use a class-group VDF because the verification complexity of its costly group operations is only O(1).

Class-group VDF construction: We now briefly introduce the construction of the class-group VDF to provide sufficient information before presenting our improvements in the following subsections.

The basis of class-group VDF is the class group of an imaginary quadratic field. In practice, the binary quadratic form is used to represent the group elements, defined as follows: $(a, b, c) = ax^2 + bxy + cy^2 \in \mathbb{Z}[x, y]$ (Equation 1). The discriminant of (a, b, c) is $d = b^2 - 4ac$ if $d \equiv 1 \pmod 4$. When $d < 0$, each (a, b, c) uniquely represents an element in the class group of an imaginary quadratic field with discriminant d. The notation Cl(d) represents a class group with discriminant d.

A non-interactive VDF proof based on the Fiat-Shamir heuristic is provided. It takes the following parameters: a hash function $d \leftarrow HD(x)$ mapping an input string x to a discriminant d, a group Cl(d), a hash function $g \leftarrow HCl(x, d)$ mapping an input string x to a group element $g = (a, b, c) \in Cl(d)$, a time parameter T, a security parameter $k\ell$, a uniformly random string $x_{root}$ (which in HeadStart is the Merkle tree root), and a hash function $H_{prime}$ mapping an input string onto a prime p (where $2^k \ell^{-1} < p < 2^k \ell$). We denote bin(s) as the binary representation of s and $\|$ as the string concatenation. Its process is as follows: 1) The prover takes the string $x_{root}$ as the input, computes $d \leftarrow HD(x_{root})$, $g \leftarrow HCl(x_{root}, d)$, and evaluates the group operations as $y \leftarrow g^{2^T}$, where $y \in Cl(d)$ is the outcome; 2) The prover computes $l \leftarrow H_{prime}(bin(g)\|bin(y))$, and generates the proof via $\pi \leftarrow g^q$, where $q = \lfloor 2T/\ell \rfloor$; and finally, sends y and $\pi$ to the verifier; 3) The verifier receives the outcome y and $\pi$, then computes the discriminant $d \leftarrow HD(x_{root})$, the group element $g \leftarrow HCl(x_{root}, d)$, the non-interactive challenge prime $\ell \leftarrow Hprime(bin(g)\|bin(y))$, and the remainder $r = 2^T \bmod \ell$. Finally, The verifier accepts the result if $\pi^\ell g^r = y$.

This process allows individuals to verify the correctness of the VDF evaluation in a constant number of group operations with respect to the time parameter T. Additionally, without knowing the group order of Cl(d), there is currently no practical way to compute $g2^T$ faster than directly performing T sequential squarings. For this reason, the class groups of imaginary quadratic fields are used to construct such groups of unknown order.

The class groups were introduced in cryptography, presenting the difficulty of computing their orders. By selecting a sufficiently large negative prime discriminant $d \equiv 1 \pmod 4$, the order of a class group Cl(d) is believed to be hard to compute. Hence, class-group VDF is used to construct a VDF without a trusted setup.

In order to reach a 128-bit security level, one must set the discriminant to 6,656 bits. Also, a specific form of discriminant called trapdoor discriminant, which breaks the unknown order property is introduced. The probability of having a trapdoor discriminant is negligible if the discriminant is chosen at random. Thus, these settings are adopted in the implementation to ensure a sufficient level of security. Below, the bit-length of a discriminant is donated as kd; when we make reference to "kd-bit discriminant d", it means d must meet the condition $2^{k_d - 1} < |d| < 2^{k_d}$.

VDF proof aggregation: How HeadStart's L VDF proofs are aggregated to a single proof to show the correctness of multiple VDFs is described based on previous paragraphs.

First, it is computed that: $g_j \leftarrow H_{Cl}(d)(x_{root,j})$, $s = bin(g_1)\| \cdots \|bin(g_n)\|bin(y_1)\| \cdots \|bin(y_n)$, $\ell \leftarrow H_{prime}(s)$ and $\alpha_j \leftarrow int(H(bin(j)\|s))$. Second, it is computed and published that the aggregated proof $\tilde{\pi} \in Cl(d)$ as follows:

$$\tilde{\pi} = \left(\prod_{j=1}^{L} g_j^{\alpha_j}\right)^{\lfloor 2T/\ell \rfloor}. \quad \text{(Equation 2)}$$

Finally, the contributor can verify VDFs of all L stages by computing $r = 2^T \bmod \ell$ and accepts if $$\tilde{\pi}^\ell \left(\prod_{j=1}^{L} g_j^{\alpha_j}\right)^r = \prod_{j=1}^{L} y_j^{\alpha_j}. \quad \text{(Equation 3)}$$

However, the procedure $g \leftarrow H_{Cl}(x, d)$ is an abstact function defined as $H_G$. In fact, it is not trivial to construct a function $g \leftarrow H_{Cl}(x, d)$ that receives a string x and a large negative prime as discriminant d to output a $g = (a, b, c) \in Cl(d)$ with respect to x. As a result, ClHash is invented, an algorithm that solves this problem and concretizes this abstract function.

An algorithm (ClHash) to construct an efficient hash function that maps a string to a class group of an imaginary quadratic field is introduced here. To the best of our knowledge, ClHash is the first efficient implementation to bring class-group VDF proof aggregation from theory into practice.

To construct ClHash, we state the problem as follows. Given an input x and a large negative prime discriminant d, where $d \equiv 1 \pmod 4$, find the $g = (a, b, c) \in Cl(d)$ with respect to x such that $d = b^2 - 4ac$ and $c \geq a \geq |b|$. We present the pseudo-code of our algorithm in FIG. 3, and the following is the procedure with detailed explanation of our algorithm: 1) We use x to deterministically generate a prime a where $a \equiv 3 \pmod 4$. 2) By observing $d = b^2 - 4ac$, we can see that $4 | b^2 - d$, so b must be an odd number. As a result, we have to find an odd number b satisfying $b^2 \equiv d \pmod a$ to ensure that $c = (b^2 - d)/4a$ is also an integer. 3) We adopt Euler's criterion: there is an integer b such that $$b^2 \equiv d \pmod a \Leftrightarrow d^{\frac{(a-1)}{2}} \equiv 1 \pmod a,$$

to test whether a satisfies the requirement. The success rate of this step is about 50%. 4) If a satisfies the requirement, we can compute $$b \equiv d^{\frac{a+1}{4}} \bmod a$$

to satisfy $b^2 \equiv d \pmod a$, because $$b^2 \equiv \left(d^{\frac{a+1}{4}}\right)^2 = d^{\frac{a+1}{2}} = d \cdot d^{\frac{a-1}{2}} \equiv d \cdot 1 \equiv d \pmod a.$$

5) If the final b is not an odd number, let b a−b. This is because if b is even and $b_2 \equiv d \pmod a$, then a−b is an odd number and $(a-b)_2 \equiv d \pmod a$. 6) Finally, we obtain the element $$g = \left(a, b, \frac{b^2 - d}{4a}\right) \in Cl(d).$$

The image of ClHash for the security of the VDF construction is analyzed. According to the prime number theorem, the number of prime numbers ≤N is $\pi(N) \approx N/\ln(N)$, so the number of 256-bit prime numbers is $\pi(2^{256}) - \pi(2^{255}) \approx 2^{247.5}$. By Dirichlet's theorem on arithmetic progressions, prime numbers are equally distributed between the classes of the form 4K+1 and 4K+3, so there are about $2^{246.5}$ 256-bit primes congruent to 3 mod 4. Now the question is: Given a 6656-bit prime number d, how many of these $2^{246.5}$ prime numbers a satisfying the constraint that d is a quadratic residue modulo a? To answer this question, we can see that given one of these a, half of the number are a quadratic residue modulo a according to Euler's criterion. Since the distribution of d is not related to a, we can estimate that about half of the 6656-bits prime numbers are a quadratic residue modulo a. In other words, half of these (a, d) pairs are valid pairs. Putting these together, given a 6656-prime number d, the expected number of valid a is half of the $2^{246.5}$ 256-bit prime numbers congruent to 3 mod 4, which is $2^{245.5}$.

To analyze the time complexity of ClHash, let $iter_a$ be the expected number of iterations needed to generate a prime with $k_l$ bits. For each generated prime, the success rate of passing the primality test is about 50% in step (3), so we need $2 \times iter_a$ iterations in expectation to generate a. Because ClHash's computation is dominated by a's generation (b and c can be efficiently computed), ClHash's expected time complexity is about $2 \times iter_a$ primality tests with $k_l$-bit numbers.

Our second improvement is determined hash prime iteration (DHPI), which can speed up the verification further by skipping those failed primality tests.

To verify the VDFs, contributors need to compute d←HD (x, $k_d$), whose pseudo-code is presented in FIG. 4, to obtain the discriminant. $H_D$ involves a primality-test procedure for verifying whether the discriminant candidate d is a prime. However, most of its running time is spent on failed primality tests, and it is time-consuming to find a valid 6,656-bit discriminant.

DHPI allows contributors to skip failed primality tests and verify the correct one directly, thereby significantly reducing the verification overhead. To achieve this, the organizer is asked to provide $iter_d$ (i.e., the number of iterations needed to generate the corresponding d) and publish it together with the Merkle tree root. The contributors can skip the primality tests in the first $iter_d - 1$ iterations, and only run it in the $i^{th}$ iteration to ensure that the final d is truly a prime.

To prevent an adversary from gaining advantage by repeating the iteration until it gets a trapdoor discriminant, we set an upper bound of $iter_d$ to ensure that the probability of finding a trapdoor discriminant within $iter_{upper}$ is negligible. During the verification phase, contributors can choose to calculate d if $iter_d \leq iter_{upper}$ is false, which occurs rarely, as estimated below.

We perform an estimation on the probability of $H_D$ failure when setting $iter_{upper}$ (fix $k_d = 6656$). First, by prime number theorem, the number of 6656-bit prime numbers is $\pi(2^{6656}) - \pi(2^{6655})$, where $\pi(N) \approx N/\log(N)$ is the prime-counting function. The number is approximately $$\frac{2^{6656}}{6656 \ln 2} - \frac{2^{6656}}{6655 \ln 2} = 2^{6655} \frac{6654}{6656 \cdot 6655 \ln 2}.$$

By Dirichlet's theorem on arithmetic progressions, prime numbers are equally distributed between the classes of form 8K+1, 8K+3, 8K+5, 8K+7. Therefore, when choosing a candidate d of form 8K+7 in each iteration of $H_D$, it has probability $$p = \frac{2 \cdot 6654}{6656 \cdot 6655 \ln 2}$$

to pass the primary test, and the probability that the organizer fails to find a valid discriminant within $iter_{upper}$ steps is approximately $(1-p)^{iter_{upper}}$. By setting $iter_{upper} = 105$, the probability is about $9 \times 10^{-16}$.

Aforesaid VDF implementation, AggVDF, adopts the ClHash algorithm to support proof aggregation in class groups of imaginary quadratic fields and supports DHPI. With ClHash, which can map strings into class groups with identical discriminants, AggVDF can create multiple elements with the same discriminant to compress their size. Compared with existing implementation, in which all the group elements must be represented in the form of (a, b, d) with different d, our elements can be easily represented in the form of (a, b) to further reduce the proof size.

In addition, the bit-length of discriminant is set to be 6,656 bits. To reach a 128-bit security level, 6,656-bit is a much secure discriminant bit length, whereas most of the current implementations of class-group VDFs use much smaller 512-bit, 1024-bit, or 2048-bit discriminants, thereby providing insufficient levels of security.

The AggVDF adopts the available implementation of class-group evaluation provided by Chia Network because Chia Network held worldwide competitions for the fastest implementation of class-group VDFs to reduce the chance that an adversary gains advantage via faster VDF evaluation. Chia Network's implementation is referred as the ChiaVDF.

Figure 8:
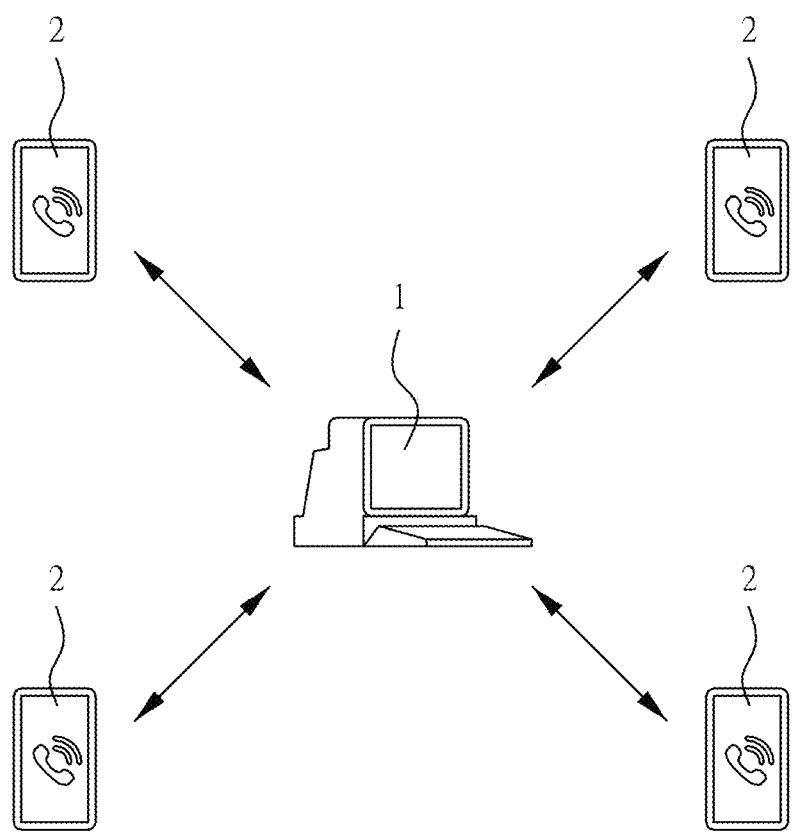
FIG. 8 shows an exemplary platform implementing a protocol used in a method of generating randomness by public participation according to the invention.

As shown in FIG. 8, in an exemplary implementation of HeadStart, a platform comprising a server 1 for the organizer and a plurality of commodity devices 2, as clients, for contributors is constructed. On the server side, we implement the VDF in C++ and the rest in Golang. On the client side, we implement HeadStart as a mobile native application and a web application. The mobile application is written in Objective-C and Objective-C++, and the web application is written in WebAssembly. Both Objective-C++ and WebAssembly use the same C++ code base, with cross-compilation to ensure implementation consistency and good performance.

HeadStart's scalability and usability are evaluated to demonstrate its practicality in public participation. Usability metrics utilized here are verification efficiency and RP latency, where the former aims to increase ease of participation so that the contributors can easily join HeadStart with their own mobile phones, and the latter aims to provide fast result publication with a sufficiently long contribution phase for the public.

HeadStart using both theoretical analysis and experiments based on the ClHash and DHPI implementation as mentioned above is evaluated. Its RP latency and verification cost under different numbers of contribution stages (L) and types of commodity devices are examined. Results confirm that HeadStart achieves efficient verification and low RP latency, as the verification time is consistently low on commodity devices with realistic settings.

To further ensure practicality in public participation, we aim to suggest a practical parameter setting not only on generic mobile phones and laptops but also on old mobile phones. As a result, iPhone 6 (two cores and used for seven years) is used to represent old mobile phones, iPhone XR (six cores) to represent generic mobile phones, and MacBook (2.3 GHZ, four cores, Intel Core i7) to represent laptops, in order to demonstrate the practicality on these devices.

To show that HeadStart can scale to a large number of contributions, the communication complexity from two perspectives are analyzed, that of the organizer and that of a contributor, as C grows, and its verification complexity with respect to the number of contributions (C) is evaluated.

The communication complexity with respect to the number of contributions can be evaluated by the space complexity of the communication messages within HeadStart. For the organizer, it takes O(C log C) space complexity to gather C contributions and post C audit paths of the Merkle trees to noninteractively show the proof-of-inclusions to each contributor. For the contributors, each of them takes O(log C) space complexity to read his audit path of the Merkle tree for proofof-inclusion. As a result, the communication complexity for each contributor is quite small, increasing ease of participation.

Figure 5:
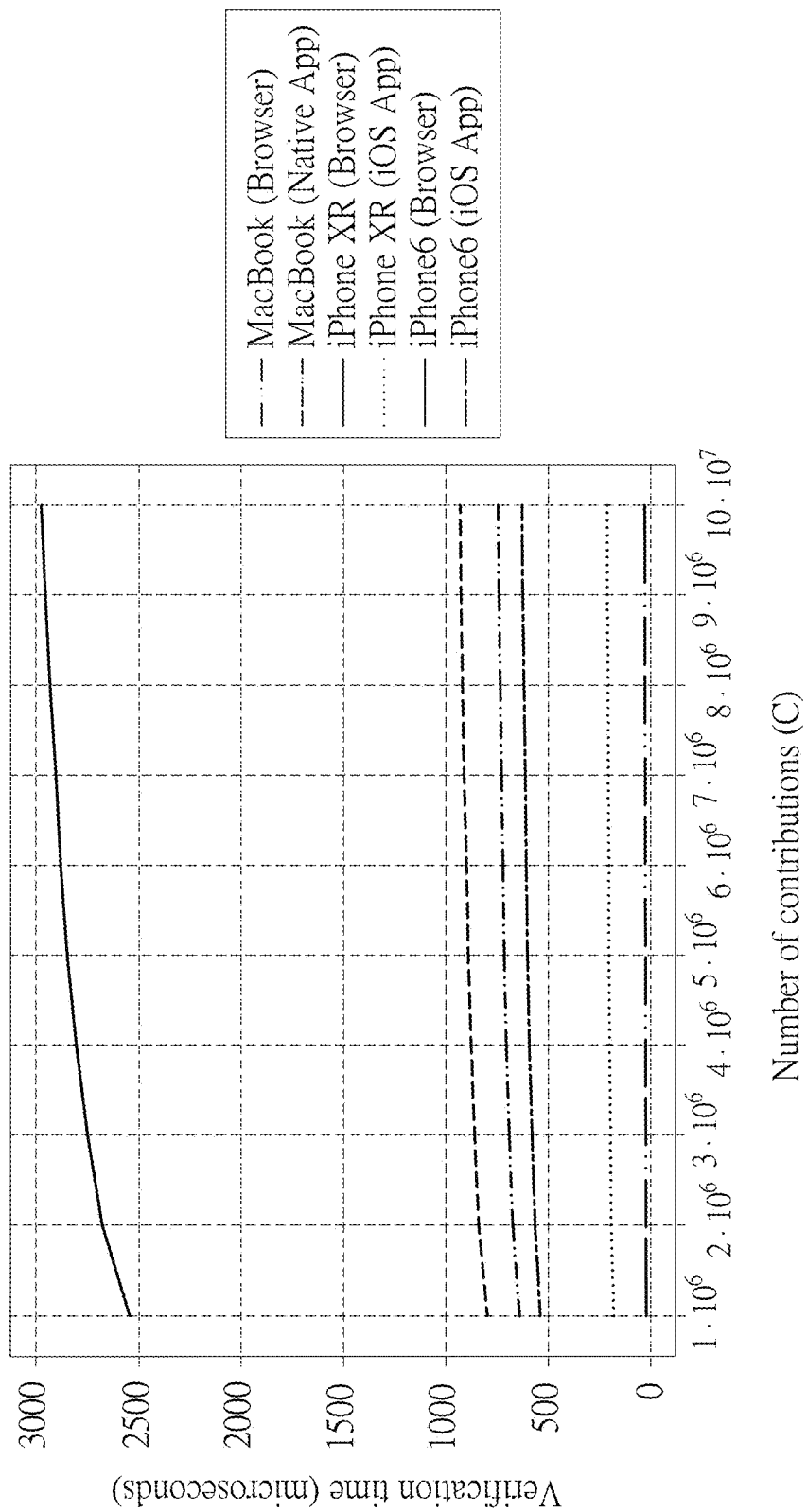
FIG. 5 shows verification time of proof-of-inclusion with respect to C, which is of logarithmic growth according to the invention.

Recall that HeadStart's verification complexity is O(L× polylog(T)+log C), where O(L×polylog(T)) is for verifying L class-group VDFs and O(log C) is for proof-of-inclusion. Validating a proof-of-inclusion in HeadStart can be done efficiently, as it requires only O(log C) hash computation and storage. A hash function such as SHA256 can be computed in a few microseconds on commodity devices. The speed of the proof-of-inclusion verification on different platforms as C increases is evaluated and it is confirmed that the time grows logarithmically, as shown in FIG. 5. Moreover, it takes only three milliseconds to verify when C=10M on the slowest platform, a browser-based implementation on an iPhone 6. Hence, our HeadStart protocol provides high scalability in practice.

The verification efficiency on both desktop (MacBook) and mobile devices (iPhone XR and iPhone 6) is presented when L=1 before advancing to L>1 for ease of understanding. Aside from the results of native macOS and iOS applications, the experiment results of our WebAssembly implementation running on the different devices' browsers is also presented. Although native applications usually perform better than browser applications, this experiment to test HeadStart's feasibility on built-in browsers is still conducted because using built-in browsers is more convenient than native applications for the contributors. In this evaluation, a length of $T_{vdf}$=24 h result-generation phase is chosen and C is fixed to one million because the verification of proof-of-inclusion is relatively fast as discussed before.

As shown in Table II, the results with DHPI on different platforms are about five times faster than those without this optimization. By adopting DHPI, the verification can finish within several seconds on native applications and in around a minute when using the browser on iPhone 6. Note that increasing the time parameter T of class-group VDF does not drastically increase the execution time of verification. Namely, with a reasonable length of the result-generation phase, such as several days or weeks, the contributors can always verify in around the time lengths shown in Table II if L=1.

TABLE II

Verification time of HeadStart with/without DHPI (L = 1, C = 1M, $T_{vdf}$ = 24 h).

| Platform | Without DHPI | With DHPI |
| --- | --- | --- |
| MacBook (Native App) | 9.63 s | 1.74 s |
| iPhone XR (iOS App) | 33.36 s | 6.21 s |
| iPhone 6 (iOS App) | 94.60 s | 16.17 s |
| MacBook (Browser) | 127.37 s | 29.76 s |
| iPhone XR (Browser) | 143.26 s | 30.33 s |
| iPhone 6(Browser) | 413.5199 s | 84.985 s |

However, we discovered that the browser implementation on mobile phones provides less than ideal user experience when L grows larger. First, the runtime of the verification procedure will be stalled when the browser tab is moved to the background. As a result, the contributor needs to keep his browser tab in the foreground for several minutes until the verification is completed. Second, multithreading is rarely supported in mobile browsers, and the only platform supporting this feature so far (Firefox57 on Android) has disabled it by default to mitigate speculative execution sidechannel attacks. However, in the case when L>1, we can adopt parallel computing to accelerate the procedure because the verifications of L VDFs can be performed independently. Although these are some real-world technical details, we still present the experiments of browsers for future investigations. Consequently, our current suggestion of client implementation on mobile phones is to use native mobile applications.

The verification's space and time overheads grow roughly linearly with the stage number L, because the complexity of the costly operations of class groups in each stage is O(1) with respect to the time parameter T. In addition, the L VDF proofs can be reduced to a single proof re via proof aggregation, and the verification of L VDFs can be accelerated by parallel computing. Consider the case when the contribution phase is opened for a week. Our experiment shows that everyone can receive the result in around 1 hour and 41 minutes after the contribution phase ends by setting L=100, while previous work needs to delay for another whole week. Hence, we consider this a reasonable parameter suggestion. In this evaluation, we set $T_{vdf}$=24 h and start the parameters from L=100.

The verification proof is composed of the audit path of the Merkle tree, the inputs $x_{root}$,j, outputs $y_j$, and proofs $\pi_j$ of VDFs across L stages. As shown in Table III, our AggVDF has a much smaller proof size than ChiaVDF. Specifically, each increment in L when L>1 will increase the difference of our proof sizes by roughly 2×832 bytes. The reason in detail is explained from two aspects. First, ChiaVDF has to use different discriminants with different input strings because it does not implement our ClHash function. As a result, it requires L−1 additional space to represent those additional discriminants, which are large negative primes (832 bytes) where $2^{6655} < |d| < 2^{6656}$. Second, ChiaVDF cannot use proof aggregation because all the VDFs are in different class groups with different discriminants, and each proof is also around 832 bytes because $d=b^2-4ac$. Consequently, ChiaVDF requires additional space for L−1 more discriminants and proofs.

TABLE III

Comparison of the Total Proof Size

| L | ChiaVDF | HeadStart AggVDF |
|---|---------|------------------|
| 100 | 334 KB | 169 KB |
| 150 | 500 KB | 252 KB |
| 200 | 667 KB | 336 KB |
| 250 | 833 KB | 419 |

Figure 6:
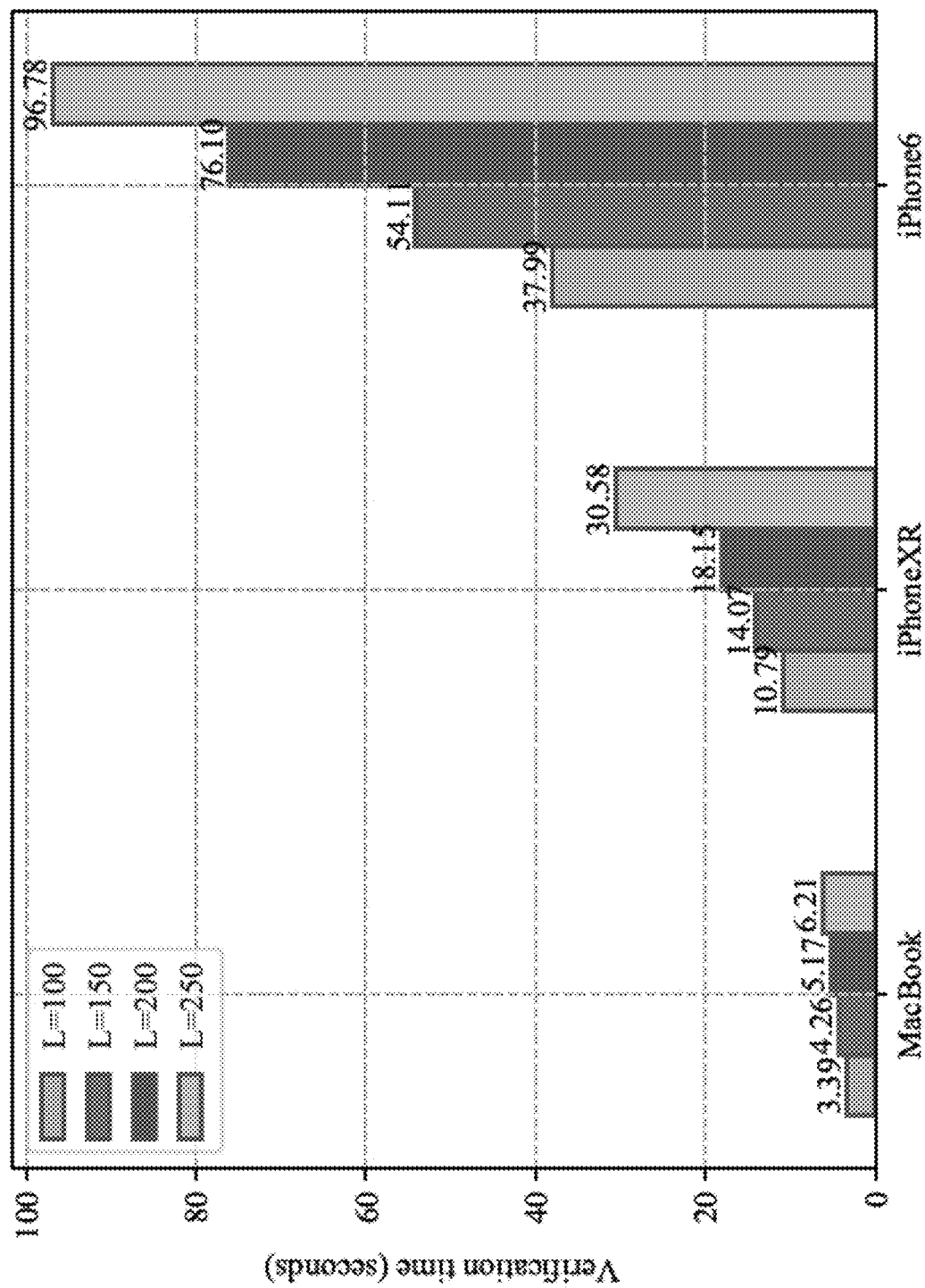
FIG. 6 shows verification time on different devices.

The verification of L VDFs can be computed in parallel because the group operations can be independently executed as shown in Equation 3. To investigate how well these tested devices can perform when set to the best condition, we present the multithreading results in FIG. 6, and the hyperthreading of MacBook is enabled. The results, when given different L, are influenced by the verification of the aggregated proof (Equation 3). The contributors have to compute the group operations $g_j^{\alpha_j}$, where $\alpha_j$ are the SHA256 checksums in practice. Therefore, every additional L results in the execution of a large number of additional operations.

The factors that might influence the length of RP latency are the time to gather contributions, build Merkle trees, publish audit paths and roots, evaluate VDFs, and publish the final result. In reality, the organizer can prefetch the contributions and prebuild the Merkle trees during the contribution phase. Besides, the audit paths and roots can be published simultaneously without delaying the procedures because VDF evaluations can be started right after their inputs are ready. The organizer simply needs to ensure that the publications will be available in time to fulfill HeadStart's requirements. The delay of the final result publication depends on the system implementation's network latency. As a result, the primary factor that we should discuss is the time variation of the VDF evaluation.

How the variation of a VDF's evaluation time affects the RP latency is discussed here. Although ideally, a VDF should run for $t_{vdf}$ time consistently in every stage, the actual duration may be slightly different and longer than $t_{vdf}$ because of the variation of CPU time. These short delays would accumulate in each result-generation stage and thus lengthen the RP latency. However, if the performance of the chosen VDF is stable, then the short delays would not cause a severe impact. Therefore, we present our experiment to show that the performance of our AggVDF is stable.

Figure 7:
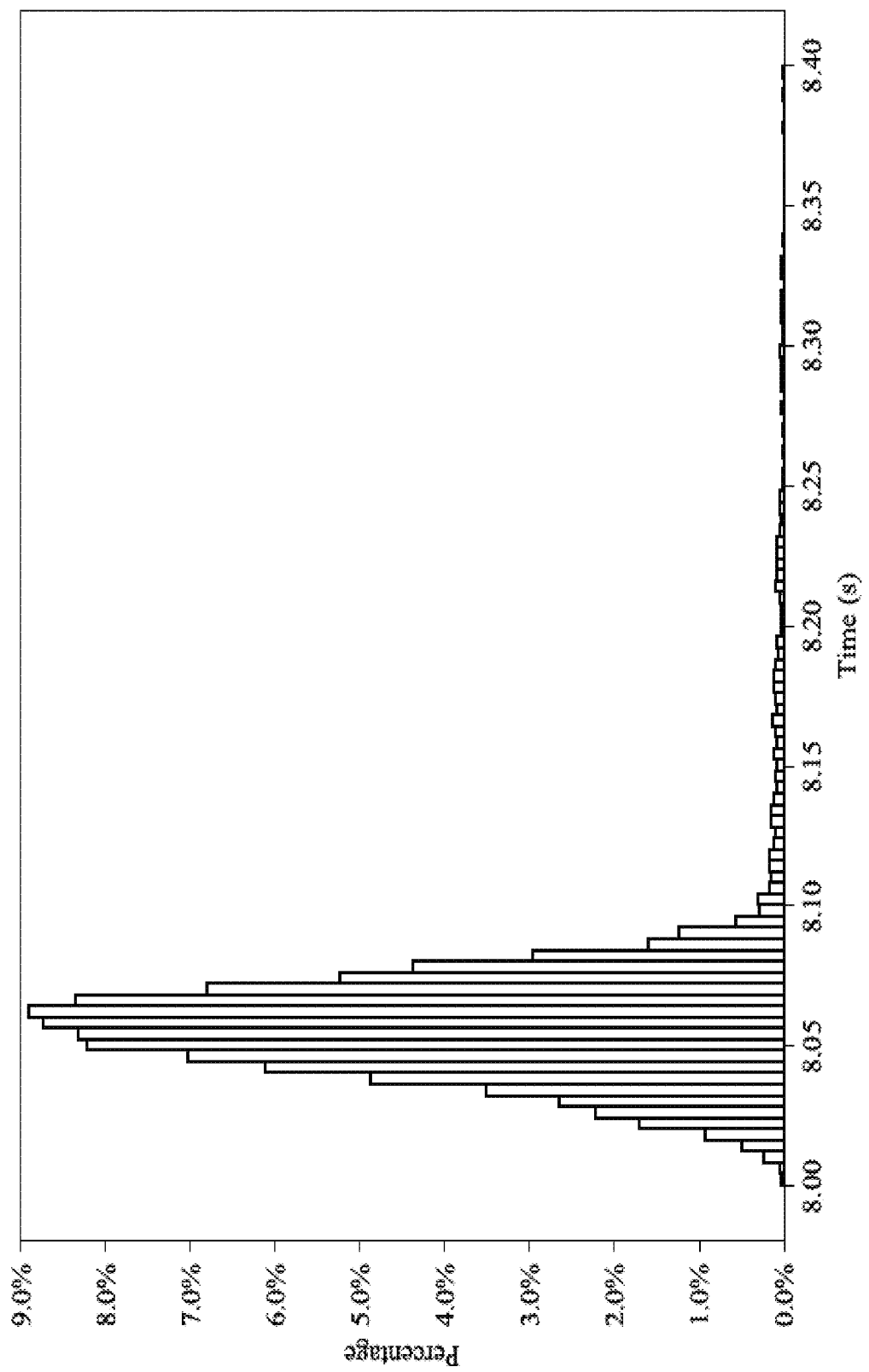
FIG. 7 shows variation of the evaluation time of AggVDF when the bit-length of the discriminant $k_d$=6656 and the number of sequential squaring t=83886.

We deploy our AggVDF on the AWS EC2 instances (c5.xlarge) with AVX enabled and set its process execution priority to the highest. We collect 10,000 records and present their distribution to show the variation. As shown in FIG. 7, the range of the data is only about 0.3 seconds, where the minimum is 8.0006 seconds, and the maximum is 8.3995 seconds. Additionally, about 95% of the data are in 8.09 seconds. As a result, we demonstrate that the performance of AggVDF is relatively stable, which shows that the variations in VDF evaluation will not significantly lengthen the RP latency.

Since the introduction of coin-flipping protocols and randomness beacons, several randomness generation techniques have been proposed. Some applied verifiable random functions (VRFs) to compute and verify the local randomness. In these schemes, participants are responsible for computing the next randomness by combining their local randomness with the previously available randomness to produce the random result. Some work extracts randomness from Bitcoin or public financial data for the same purpose. However, these protocols are not suitable for public participation because they do not prevent malicious participants from withholding the random output until gaining advantage.

To defend against biasing attacks, there are mainly two types of strategies. One delays the inputs of the result generation, such as commitment scheme, PVSS, and threshold signature schemes. The other delays the duration of result generation, such as delay functions and VDFs. The main idea of them is to prevent an adversary from stealthily crafting a desirable result.

TABLE IV

Comparison of related work by usability and scalability properties

| | Usability | | | Scalability | |
|---|---|---|---|---|---|
| | Verif. complexity | RP latency | No. of honest contributors | Communication complexity (as a contributor) | Misc. Cryptographicpr imitive(s) |
| Protocol A | O(T + C) | O(T) | 1 | O(C) | VRF + delay function |
| Protocol B | O(T + log C) | O(T) | 1 | O(log C) | VRF + delay function |
| Protocol C | O(C) |  | 2/3C + 1 | O(C) | PVSS |
| Protocol D | O(C log T) | O(T) | C/2 | O(C) | VDF |
| HeadStart | O(L log T + log C) | O(T/L) | 1 | O(log C) | VDF |

Some recent schemes, such Protocol C, adopted PVSS to increase the system availability. By adopting such threshold cryptographic techniques, the majority of participants can recover those unrevealed secrets, alleviating the issue in traditional commitment schemes. However, these protocols require an honest majority to reveal the secret securely; one honest contributor is insufficient to guarantee their security.

To delay the duration of the result generation, several schemes adopt delay functions or time-lock puzzles but with high verification costs. The recently proposed Protocol D adopts VDF to construct randomness beacons, which requires a predefined fixed set of participants to propagate their VDF results in a round-robin manner. Its design allows an honest participant to compute his own VDF through the trapdoor in O(log T). However, if there are m malicious participants who do not propagate their results, the RP latency will be drastically lengthened by m×T because the remaining participants need to compute for a length of time T to recover each missing result.

Most of the recent schemes that we mentioned assume a predefined fixed set of participants or rely on an honest majority. One of their main applications is to generate a verifiable result for the third-party verifiers by a group of preregistered or private participants with powerful machines, because these protocols have high communication or computational overheads. However, in the scenario of public participation events, it is impractical to ask ordinary people to participate in such protocol due to the honest majority assumption. For public participation events, it is much more convincing for the public to directly contribute, like in HeadStart, so that they can easily fulfill the assumption that at least one contributor is honest, rather than asking them to believe that the system has an honest majority.

The two lottery systems proposed by Protocol A and Protocol B are much more similar to our public participation scenarios, which open for the public to participate and only assumes one honest participation. As a result, we present table IV to summarize representative related protocols: the two lottery systems, Protocol C, which is the latest work based on PVSS, and Protocol D, which is the latest work based on VDF. Because all schemes included in the table satisfy unpredictability and bias-resistance, we only compare them based on our desired usability and scalability properties.

It is to be understood that these embodiments are not meant as limitations of the invention but merely exemplary descriptions of the invention with regard to certain specific embodiments. Indeed, different adaptations may be apparent to those skilled in the art without departing from the scope of the annexed claims.

What is claimed is:

1. A method of generating randomness by public participation, applied to a server of an organizer, the server being capable to communicate with a plurality of commodity devices of a plurality of participants, as clients, comprising steps of:
communicating, with the server, with the commodity devices to execute a protocol comprising a setup phase, a contribution phase and a result-generation phase, wherein:
in the setup phase, a plurality of parameters are initialized, a verifiable delay function (VDF) is setup, and at least a plurality of the parameters are published;
the contribution phase is divided into at least one first stage, the plurality of published parameters are provided to the commodity devices, a plurality of random values are received from the commodity devices, and a Merkle tree root, $x_{root, j}$, and Merkle tree audit paths are published in each of the at least one first stage; and
the result-generation phase is divided into at least one second stage, an amount of which is the same as that of the at least one first stage, each of the at least one second stage is dedicated to one of the at least one first stage which is a period ahead with respect to the at least one second stage, and computation is performed to generate a result of randomness, y which is published afterwards.

2. The method of generating randomness by public participation according to claim 1, wherein the plurality of initialized parameters comprise a security parameter k, a cryptographic hash function H, a σ-sequential VDF, an amount of parameters of the first stages L, $t_{contri}$, ϵ, and $t_{vdf}$, $σ(t_{vdf})$, T, $T_{contri}$ and $T_{vdf}$, wherein VDF=(Setup, Eval, Verify) with k-bit security level where Setup (k, T)→pp= (ek, vk), Eval (ek, x)→(y, π), Verify(vk, x, y, π)→{True, False}, ek is an evaluation key, vk is a verification key, wherein $σ(t_{vdf}) > t_{contri} + ϵ$, $t_{contri} = T_{contri}/L$ and $t_{vdf} = T_{vdf}/L$, $t_{contri}$ is a duration of a contribution stage, ϵ is a duration of computing the Merkle tree root $x_{root, j}$ after the end of one of the at least one first stage of the contribution phase, $t_{vdf}$ is a duration of the VDF, $σ(t_{vdf})$ is a lower bound of Eval with O(poly(T, k)) processors, T is a time parameter of VDF, $T_{contri}$ is a duration of the contribution phase, $T_{vdf}$ is a duration of the result-generation phase, and y is a final result of randomness.

3. The method of generating randomness by public participation according to claim 2, wherein in the setup phase, the VDF is configured by running pp←Setup (k, $t_{vdf}$), and a pp specifies the input space of x and the output space of y.

4. The method of generating randomness by public participation according to claim 1, wherein in each of the at least one first stage of the contribution phase, the random values received from the commodity devices are published, the server gathers the contributions $(x_{1,j}, x_{2,j}, \ldots)$, where $x_{i,j}$ is a $i^{th}$ contribution in a $j^{th}$ first stage.

5. The method of generating randomness by public participation according to claim 4, wherein in each of the at least one first stage, the Merkle tree root $x_{root, j}$ of a $j^{th}$ first stage of the at least one first stage is computed with $X_{root, j} \leftarrow \text{Merkle\_Tree}_H(x_{1,j}, x_{2,j}, \ldots)$, and H is a cryptographic hash function.

6. The method of generating randomness by public participation according to claim 2, wherein in the result-generation phase, a first one of the result of randomness $y_1$ of the at least one first stage is computed with $(y_1, π_1) \leftarrow \text{Eval}(ek, x_{root, 1})$, the rest of the result of randomness y of a $j^{th}$ first stage (j>1) of the at least one first stage is computed with $(y_j, π_j) \leftarrow \text{Eval}(ek, H(x_{root,j}\|y_{j-1}))$, where $y_j$ is a randomness of a $j^{th}$ second stage, $π_j$ is a VDF proof, and $π_j$ is published as well.

7. The method of generating randomness by public participation according to claim 6, wherein in the result-generation phase, a last one of the result of randomness $y_L$ of the at least one first stage is published around the time of length $L \times t_{vdf} + ϵ - (L-1) \times t_{contri}$ after the contribution phase.

8. The method of generating randomness by public participation according to claim 1, wherein a computational complexity of a verification of the protocol is O(L×polylog (T)+log C), in which L is an amount of the first stage, T is a time parameter of VDF and C is an amount of contributions.

9. The method of generating randomness by public participation according to claim 1, wherein a computational complexity of a result-publication latency of the protocol is O(T/L), in which T is a time parameter of VDF and L is an amount of the first stage.

10. A method of generating randomness by public participation, applied to a commodity device of a participant, as a client, the commodity device being capable to communicate with a server of an organizer, comprising steps of:
communicating, with the commodity device, with the server to execute a protocol comprising a contribution phase, a result-generation phase and a verification phase, wherein:
in the contribution phase, which is divided into at least one first stage, a plurality of published parameters are received and saved in the commodity device, and a plurality of random values for being published on a bulletin board, as a contribution $x_{i,j}$, are output from the commodity device to the server; and
after a result of the randomness y is published in the result-generation phase, which is divided into at least one second stage, an amount of which is the same as that of the at least one first stage, in the verification phase, the result of the randomness y is verified by computing a root, r, with a Merkle tree audit path dedicated to the commodity device, published on the bulletin board in the contribution phase and acquired from the bulletin board, from the contribution $x_{i,j}$, and comparing the computed root, r, with a Merkle tree root, $x_{root,\ j}$, published on the bulletin board in the contribution phase, in which the randomness y is deemed to be verified if at least one condition is satisfied, the at least one condition comprises the computed root, r, matches the Merkle tree root, $x_{root,\ j}$.

11. The method of generating randomness by public participation according to claim 10, wherein in the verification phase, the result of the randomness y is verified by confirming if a publication time of the Merkle tree root, $x_{root,\ j}$, is within a time of length $\epsilon$ after the end of a $j^{th}$ first stage of the at least one first stage of the contribution phase, in which $\epsilon$ is a duration of computing the Merkle tree root $x_{root,\ j}$, and the at least one condition further comprises the publication time of the Merkle tree root, $x_{root,\ j}$, is within the time of length $\epsilon$.

12. The method of generating randomness by public participation according to claim 11, wherein in the verification phase, the result of the randomness y is verified by computing Verify(vk, $H(x_{root,j} \| y_{j-1})$, $y_j$, $\pi_j$) when j>1 and Verify(vk, $x_{root,\ 1}$, $y_1$, $\pi_1$) when j=1, in which vk is a verification key, and the at least one condition further comprises Verify, corresponding to the randomness $y_j$, returns true.

13. The method of generating randomness by public participation according to claim 10, wherein in the verification phase, the result of randomness is unpredictable and bias-resistant is assured by the verification of the result of the randomness y.

14. The method of generating randomness by public participation according to claim 10, wherein a computational complexity of verification of the protocol is O(L× polylog(T)+log C), in which L is an amount of the first stage, T is a time parameter of VDF and C is an amount of contributions.

15. The method of generating randomness by public participation according to claim 10, wherein a computational complexity of a result-publication latency of the protocol is O(T/L), in which T is a time parameter of VDF and L is an amount of the first stage.

* * * * *